US008440926B2

(12) United States Patent
Stiehl et al.

(10) Patent No.: US 8,440,926 B2
(45) Date of Patent: May 14, 2013

(54) LOW PROFILE TAPE STRUCTURES

(75) Inventors: Kurt Stiehl, San Jose, CA (US); Albert J. Golko, Saratoga, CA (US); Scott A. Myers, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 428 days.

(21) Appl. No.: 12/797,580

(22) Filed: Jun. 9, 2010

(65) Prior Publication Data

US 2011/0303447 A1  Dec. 15, 2011

(51) Int. Cl.
*H01H 5/30* (2006.01)
*B32B 7/12* (2006.01)

(52) U.S. Cl.
USPC ............. 200/406; 428/214; 428/343; 24/304

(58) Field of Classification Search ............ 200/5 A, 200/61.41–61.44, 406, 511, 512, 516, 85 R–85 A, 200/302.1, 302.3; 428/212–216, 220, 343, 428/351, 352, 355 R, 128, 336; 24/304; 427/207.1
See application file for complete search history.

(56) References Cited

U.S. PATENT DOCUMENTS

| | | | | |
|---|---|---|---|---|
| 4,463,234 A | * | 7/1984 | Bennewitz | 200/516 |
| 4,525,416 A | * | 6/1985 | Hammerschmidt et al. | 428/220 |
| 4,972,394 A | * | 11/1990 | DiMarco | 368/227 |
| 5,598,527 A | * | 1/1997 | Debrus et al. | 345/173 |
| 5,660,922 A | * | 8/1997 | Herridge et al. | 428/214 |
| 6,614,905 B1 | * | 9/2003 | Kristensen | 379/368 |
| 6,956,283 B1 | | 10/2005 | Peterson | |
| 7,132,161 B2 | | 11/2006 | Knowles et al. | |
| 7,411,143 B2 | * | 8/2008 | Shin et al. | 200/314 |
| 8,039,103 B2 | * | 10/2011 | Tosaki et al. | 428/355 AC |
| 8,258,418 B2 | * | 9/2012 | Chen | 200/302.1 |
| 2004/0091689 A1 | * | 5/2004 | Tosaki et al. | 428/214 |
| 2006/0096847 A1 | * | 5/2006 | Nishimura et al. | 200/406 |
| 2009/0046832 A1 | * | 2/2009 | Birnbaum et al. | 378/45 |
| 2009/0148645 A1 | * | 6/2009 | Nishiyama et al. | 428/41.8 |

FOREIGN PATENT DOCUMENTS

| | | |
|---|---|---|
| WO | 2008/047144 | 4/2008 |
| WO | 2009/067482 | 5/2009 |

\* cited by examiner

*Primary Examiner* — Michael Friedhofer
(74) *Attorney, Agent, or Firm* — Treyz Law Group; G. Victor Treyz; David C. Kellogg (57) ABSTRACT

Electronic devices may include electronic device structures such substrates, structures with cavities, and housing structures. Tape may be used to seal components to the surface of a substrate or within a cavity. The tape may have a nonstick polymer layer such as a layer of parylene and one or two layers of adhesive. The nonstick layer may be formed in a pattern so that some of the layer of adhesive is uncovered by the nonstick layer. The nonstick layer may be oriented so that the adhesive is interposed between the nonstick layer and a sealed component or may be oriented so that the nonstick layer is interposed between the adhesive layer and the sealed component. The component that is sealed by the tape may be an electrical component such as a dome switch or other mechanical or electrical component.

18 Claims, 9 Drawing Sheets

LOW PROFILE TAPE STRUCTURES

BACKGROUND

This relates generally to adhesive tape, and more particularly, to low profile tapes that connect and seal structures such as structures in electronic devices.

Electronic devices include components such as switches and other structures that can be sensitive to environmental intrusion. If dust or moisture invades the interior of a dome switch, for example, the switch may malfunction. Tape layers and coatings may be used to seal components such as these.

Electronic devices also include structures that are attached together using adhesive. In some arrangements, layers of adhesive-coated tape are used to connect structures together.

Conventional sealing approaches are not always able to provide adequate environmental protection.

Adhesive-tape attachment arrangements sometimes produce stack ups that are thicker than desired, due in part to the thickness of the adhesive-backed tape that is used in connecting device structures together. It may therefore not always be possible to use conventional adhesive-backed tape in sealing and attachment applications.

It would therefore be desirable to be able to provide improved adhesive-tape-based structures for sealing and securing structures for electronic device.

SUMMARY

Electronic devices may include electronic device structures such substrates, structures with cavities, and housing structures. Components such as dome switches, other electrical components, and mechanical components may be mounted in the cavities or on substrate surfaces.

Tape may be used to attach structures together and to seal electrical and mechanical components to prevent intrusion of dust and moisture.

The tape may have a flexible polymer substrate and one or more layers of adhesive. The tape may be implemented in a single-sided configuration, a configuration with a patterned substrate layer, or a double-sided configuration.

The flexible polymer substrate in the tape may be formed from a nonstick liner material such as parylene. This allows the thickness of the nonstick polymer layer to be significantly thinner than the thickness of the adhesive in the tape. For example, the nonstick layer may have a thickness that is ten times less than the adhesive (as an example).

The nonstick layer may be formed in a pattern so that some of the layer of adhesive is uncovered by the nonstick layer. The nonstick layer may be oriented so that the adhesive is interposed between the nonstick layer and a sealed component or may be oriented so that the nonstick layer is interposed between the adhesive layer and the sealed component. The component that is sealed by the tape may be an electrical component such as a dome switch or may be another mechanical or electrical component.

Further features of the invention, its nature and various advantages will be more apparent from the accompanying drawings and the following detailed description of the preferred embodiments.

DETAILED DESCRIPTION

Layers of adhesive may be used in assembling structures in devices. For example, layers of adhesive-coated tape may be used to seal structures and may be used to attach structures together. The structures that are sealed and fastened together using adhesive-backed tape layers and other layers of adhesive may be, for example, electrical and mechanical structures in an electronic device such as a media player, a cellular telephone, a computer, or other electronic device. Adhesive layers may be helpful for reducing device size, for reducing assembly costs, for reducing part counts by avoiding the need to use fasteners such as screws, and for forming environmental seals to prevent the intrusion of dust and moisture.

Figure 1:
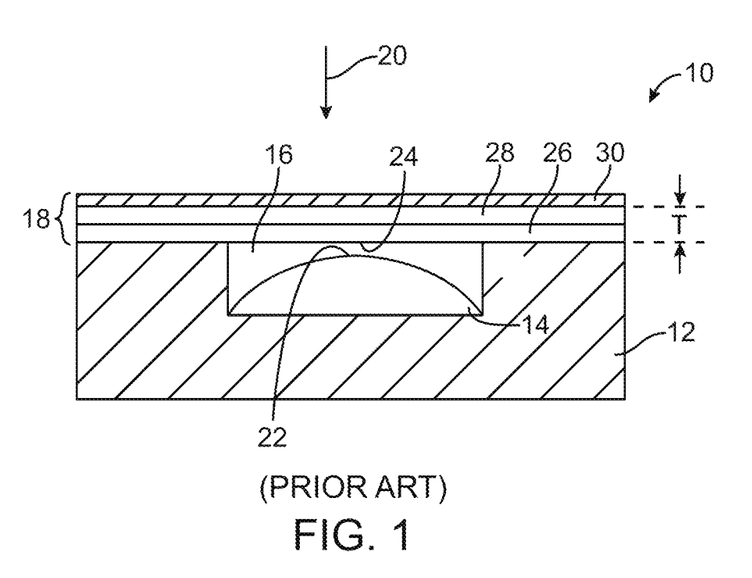
FIG. 1 is a cross-sectional side view of a conventional dome switch sealed with a layer of adhesive tape and a coating of parylene.

A conventional switch that has been sealed using tape is shown in FIG. 1. As shown in FIG. 1, switch 10 has a body 12 that is formed from a material such as plastic. Dome switch 14 is mounted within cavity 16 in body 12. The underside of dome switch 14 has a conductive coating. Layers 18 cover and seal dome switch 14 within cavity 16.

When a user presses downward in direction 20 on layers 18, underside 24 of layers 18 presses against upper surface 22 of dome switch 14. This collapses the dome switch and causes the conductive coating on the interior of the dome switch to short together a pair of associated switch terminals.

Layers 18 may include a one-sided adhesive tape formed from adhesive layer 26 and liner layer 28. In a typical one-sided tape such as the tape used in FIG. 1, the thickness T of the one-sided tape formed from layers 26 and 28 is about 100 microns (e.g., with about 50 microns of adhesive layer 26 and about 50 microns of liner 28).

To form a satisfactory environmental seal, the structures of FIG. 1 including the adhesive tape formed from layers 26 and 28 may be coated with parylene layer 30. Parylene is a material formed from poly(p-xylylene) polymers. Parylene is widely used for forming environmental sealing layers (i.e., moisture barriers). In a typical process, parylene layer 30 of FIG. 1 may be deposited on the structures of FIG. 1 and the tape layer formed from adhesive 26 and liner 28 using chemical vapor deposition. While this approach may form a satisfactory moisture barrier on switch 10 that prevents moisture from intruding into cavity 16, there is a potential for the parylene coating itself to intrude into cavity 16 and dome switch 14 during the chemical vapor deposition process. In this situation, dome switch 14 may not function properly. The thickness T of the tape layer formed from adhesive 26 and liner 28 may also be greater than desired, particularly in compact device applications.

Figure 2:
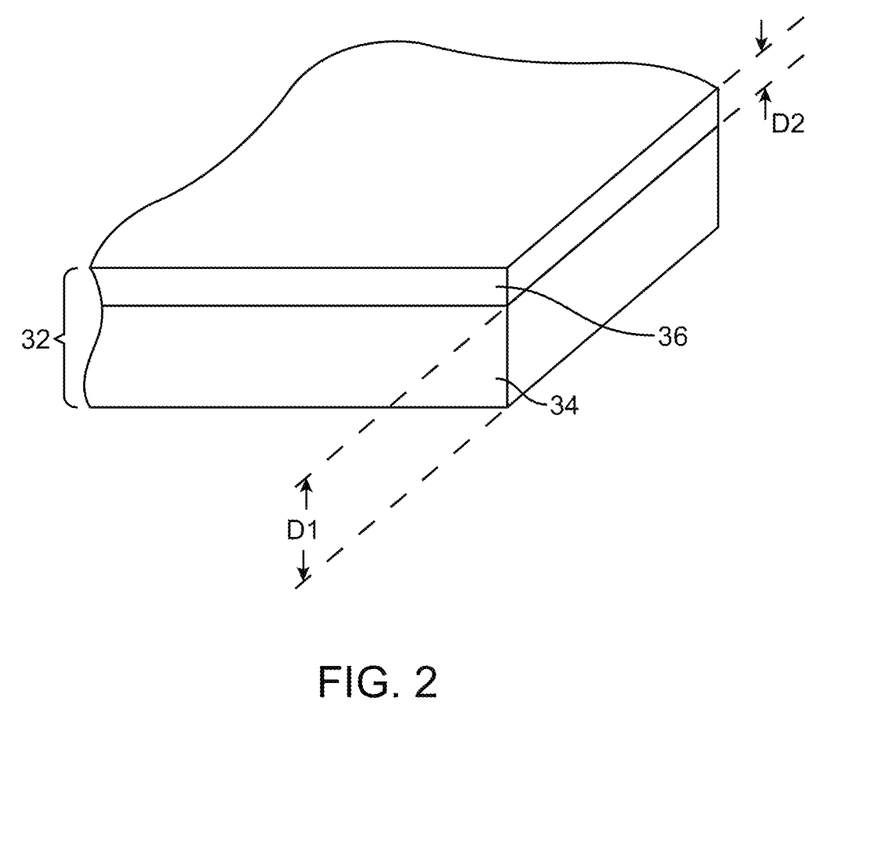
FIG. 2 is a perspective view of a piece of one-sided adhesive tape having an adhesive layer backed by a thin nonstick polymer layer such as a layer of parylene in accordance with an embodiment of the present invention.

To reduce tape thickness while reducing the potential for parylene contamination of device components, a one-sided tape of the type shown in FIG. 2 may be formed. Tape 32 of FIG. 2 may have a layer of nonstick polymer liner 36 (i.e., a flexible substrate sheet) and a layer of adhesive 34.

Liner layer 36 may be formed from a polymer such as parylene or other suitable material nonstick material that can serve as a substrate for adhesive 34. For example, layer 36 may be formed from poly(p-xylylene) polymers using chemical vapor deposition. Parylene is able to form pin-hole free layers of several nanometers in thickness, helping to minimize the overall thickness of tape 32. When tape 32 is implemented using parylene (e.g., when tape 32 is single-sided or double-sided parylene tape), tape thickness can be reduced relative to tape configurations that use relatively thick liner layers. Thickness D2 of layer 36 may be 2 nm to 5 microns, 5-100 nm, 20-60 nm, about 40 nm, less than 3 microns, less than 1 micron, less than 0.5 microns, less than 100 nm, less than 50 nm, or greater than 50 nm (as examples).

Layer 34 may be formed from an adhesive such as a permanent or removable pressure sensitive adhesive (PSA). The thickness D1 of layer 34 is typically significantly larger than the thickness D2. For example, D1 may be three times thicker than D2 and D2 may be three times thinner than D1, D1 may be five times thicker than D2 and D2 may be five times thinner than D1, D1 may be ten times thicker than D2 and D2 may be ten times thinner than D1, or D1 may be 100 times thicker than D2 and D2 may be 100 times thinner than D1 (as examples). Typical thicknesses D2 of adhesive layer 34 are 5-100 microns, 5-20 microns, about 10 microns, less than 70 microns, less than 50 microns, less than 20 microns, less than 15 microns, more than 20 microns, about 1-50 microns, etc. Any combination of these illustrative values for thicknesses D1 and D2 may be used if desired.

Tape 32 may be provided with a removable backing layer and may be dispensed from a roll (as an example). Cut pieces of tape 32 may be placed over a component that is to be sealed. The component that is to be sealed may be, for example, an electrical component such as a switch, a speaker, a microphone, a light source, a sensor, or other electrical device. The component that is to be sealed may also be a mechanical component such as a mechanical component that is sensitive to dust or moisture.

Figure 3:
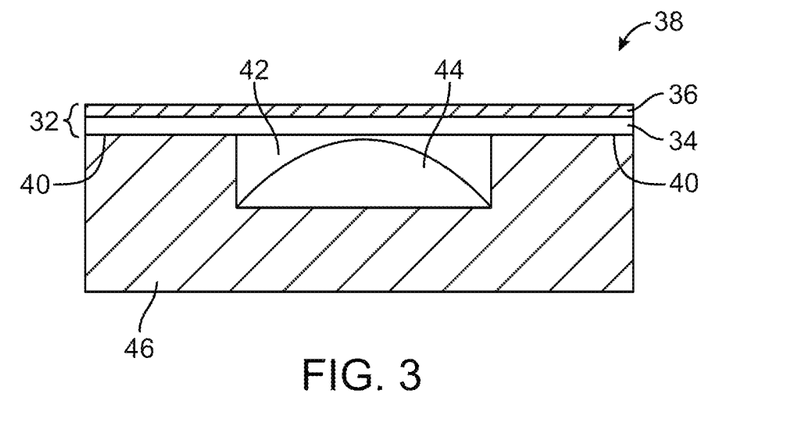
FIG. 3 is a cross-sectional side view of an electrical component such as a dome switch that has been sealed using a one-sided adhesive tape layer of the type shown in FIG. 2 in accordance with an embodiment of the present invention.

FIG. 3 is a cross-sectional side view of an illustrative dome switch that has been sealed using tape of the type shown in FIG. 2. As shown in FIG. 3, dome switch 38 may be sealed by placing one-sided adhesive tape 32 so that adhesive layer 34 is attached to surface 40 of switch body structure 46. Structure 46 may be formed form plastic or other suitable materials. The shape of structure 46 may form a cavity such as cavity 42 in which dome switch 44 is mounted. When tape 32 is attached to surface 40 of structure 46 in the orientation shown in FIG. 3, adhesive layer 34 is located on the inner (interior) surface of tape (adjacent to internal cavity 42) and liner layer 36 is located on the outer (exterior) surface of tape 32.

Figure 4:
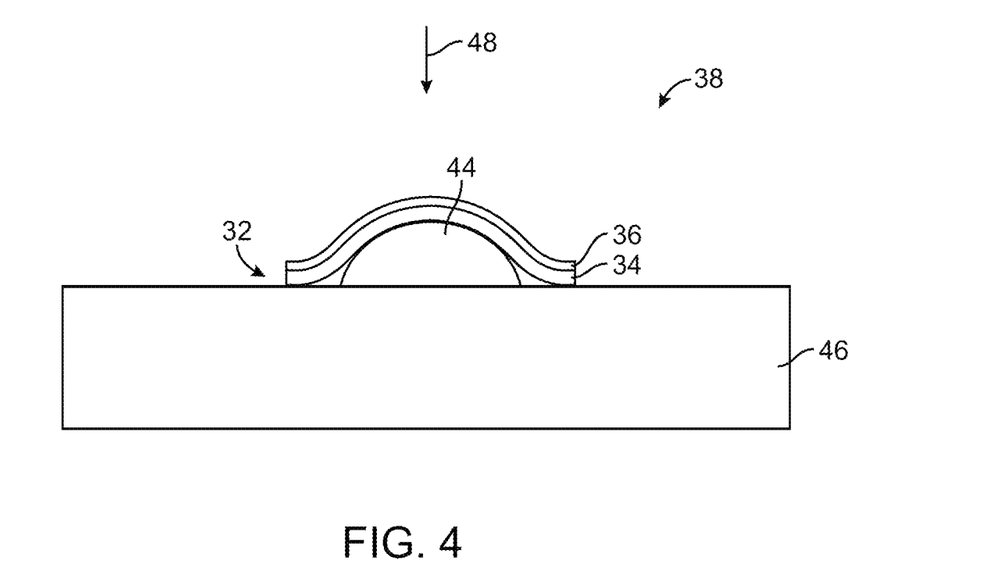
FIG. 4 is a cross-sectional side view of an illustrative electronic component such as a switch that has been covered with a layer of tape of the type shown in FIG. 2 in accordance with an embodiment of the present invention.

If desired, tape 32 may be used to seal components that are not mounted within housing cavities. A cross-sectional side view of an illustrative electronic component such as a switch that has been covered with a layer of tape of the type shown in FIG. 2 is shown in FIG. 4. In the FIG. 4 example, switch 38 has a dome switch element that is mounted on the planar surface of substrate 46. As shown in FIG. 4, dome switch element 44 has been covered with tape 32 so that adhesive 34 is attached to substrate 46. Substrate 46 may be formed from plastic, metal, glass, ceramic, composite materials, or combinations of these materials. Tape 32 may have a circular or rectangular footprint (i.e., a circular or rectangular outline when viewed in direction 48).

Figure 5:
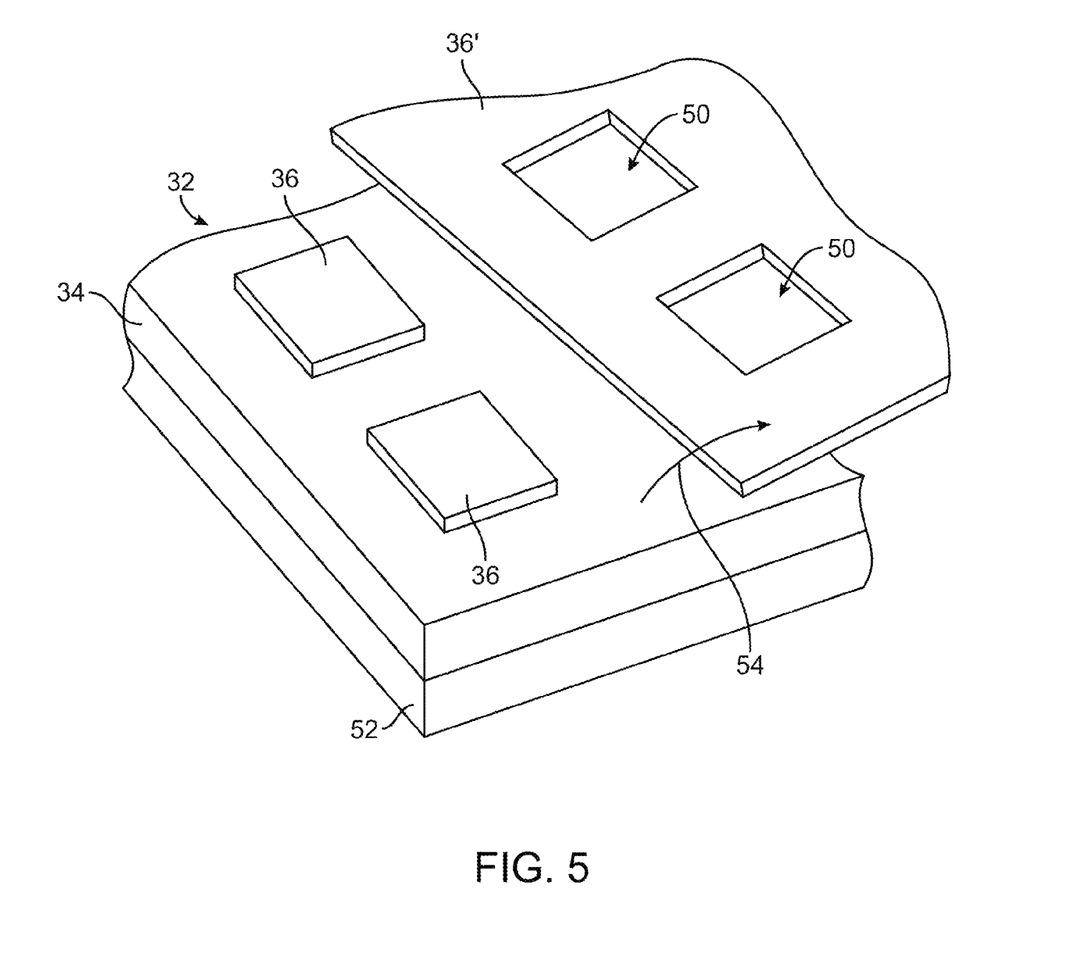
FIG. 5 is a perspective view of an illustrative tape-based structure that has a removable backing layer, a layer of adhesive, and a patterned coating of a thin polymer such as parylene in accordance with an embodiment of the present invention.

If desired, tape layers such as adhesive layer 34 and nonstick layer 36 may be patterned. FIG. 5 shows an illustrative arrangement in which tape layer 32 is formed by depositing adhesive 34 on a removable backing layer such as layer 52 (e.g., a layer of polymer that does not adhere well to adhesive 34). Nonstick polymer layer 36 may be formed on top of layer 34. Layer 36 may be patterned using a mask during chemical vapor deposition, using a laser cutting tool, using a stamp, blade, or other mechanical cutting tool, etc. As shown in FIG. 5, portion 36' of layer 36 may then be removed in direction 54, leaving openings 50 in layer 36' and corresponding patterned portions of layer 36 on adhesive layer 34. When it is desired to use tape 32 of FIG. 5 to seal structures in an electronic device, polymer layers 36 may be placed over the structures to be sealed and backing layer 52 may be removed.

Figure 6:
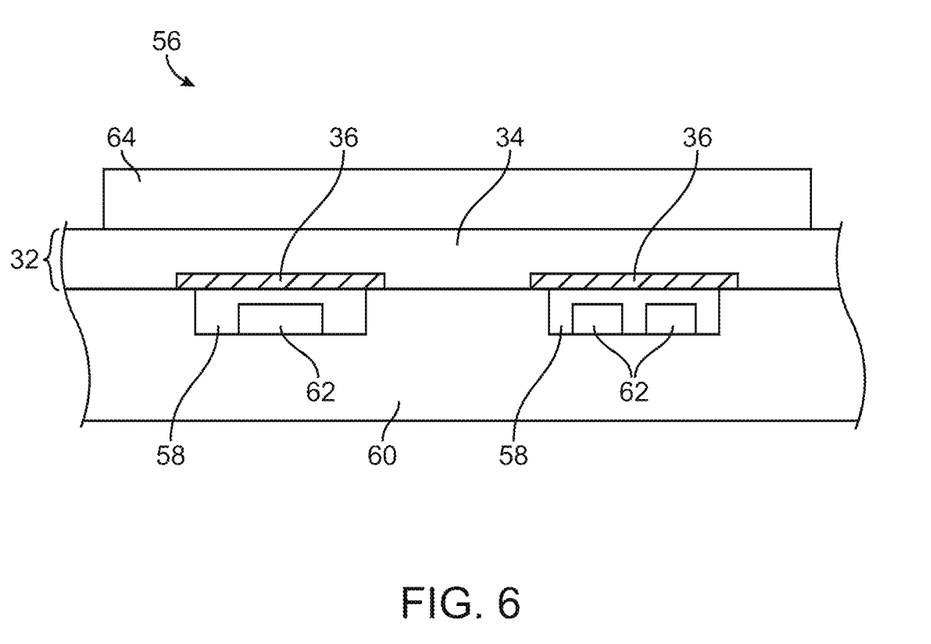
FIG. 6 is a cross-sectional side view showing electronic device structures such as switches and other electrical and mechanical components that have been sealed using a tape structure of the type shown in FIG. 5 in accordance with an embodiment of the present invention.

FIG. 6 is a cross-sectional side view of electronic device structures 56 in which patterned tape such as tape 32 of FIG. 5 has been used to seal cavities 58 in structure 60. Structure 60 may be, for example, a housing structure in which electrical and mechanical components 62 have been mounted. Components 62 may include dome switches, other switches, circuits, speakers, microphones, sensors, and other electrical and mechanical devices. Cavities 58 may be filled with air (as an example). Sealing layers 36 may have a shape (e.g., a rectangular footprint) that overlaps the outline of cavities 58 (which may also be rectangular).

Adhesive 34 may be used to attach layers 36 to the upper surface of structure 60. When backing 52 (FIG. 5) is removed, the outer (upper) surface of adhesive layer 34 will be exposed. If desired, additional structures such as structure 64 may be attached to structure 60 by placing structure 64 on adhesive 34.

Figure 7:
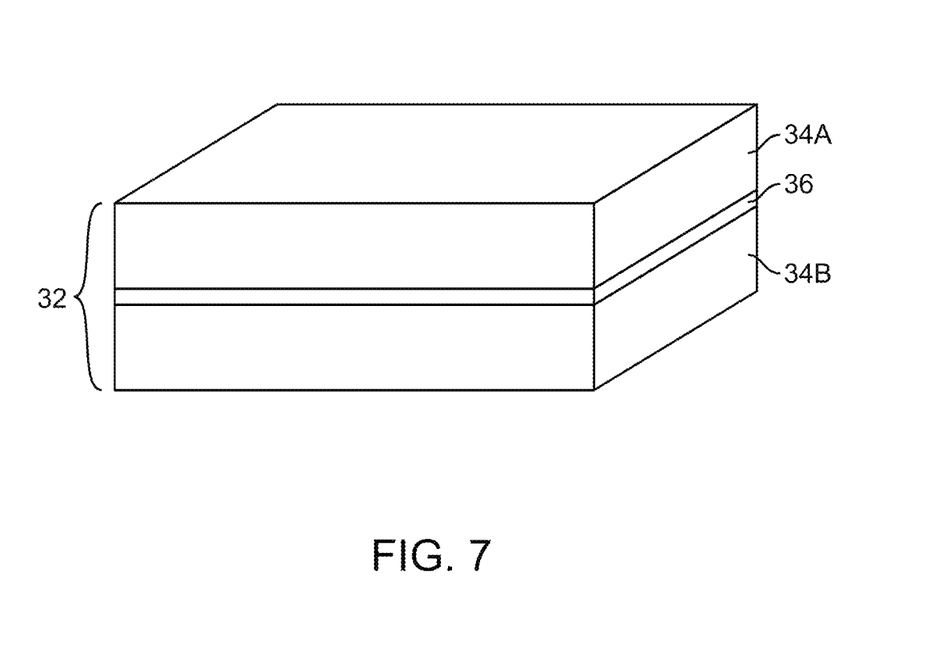
FIG. 7 is a perspective view of a double-sided adhesive tape formed from a thin polymer layer such as a parylene layer coated on both surfaces with layers of adhesive in accordance with an embodiment of the present invention.

If desired, polymer layer 36 (e.g., a parylene layer) may be used as a substrate in forming a double-sided tape (i.e., by adding an adhesive layer to the exposed surface of a parylene layer or other polymer layer after a single-sided tape structure has been formed. An illustrative double-sided tape structure that may be used for tape 32 is shown in FIG. 7. As shown in FIG. 7, tape 32 may have upper adhesive layer 34A and lower adhesive layer 34B. Polymer layer 36 may be interposed between layers 34A and 34B. Layers 34A and 34B may be formed form pressure sensitive adhesive. Layer 36 may be formed from a polymer such as parylene. For example, layer 36 may be formed from poly(p-xylylene) polymers (parylene) using chemical vapor deposition.

Layer 36 may have a thickness of 2 nm to 5 microns, 5-100 nm, 20-60 nm, about 40 nm, less than 3 microns, less than 1 micron, less than 0.5 microns, less than 100 nm, less than 50 nm, or greater than 50 nm (as examples). Layers 34A and 34B may each have a thickness that is significantly larger than the thickness of layer 36. For example, layers 34A and 34B may each have a thickness of 5-100 microns, 5-20 microns, about 10 microns, less than 70 microns, less than 50 microns, less than 20 microns, less than 15 microns, more than 20 microns, 1-50 microns, etc.

Figure 8:
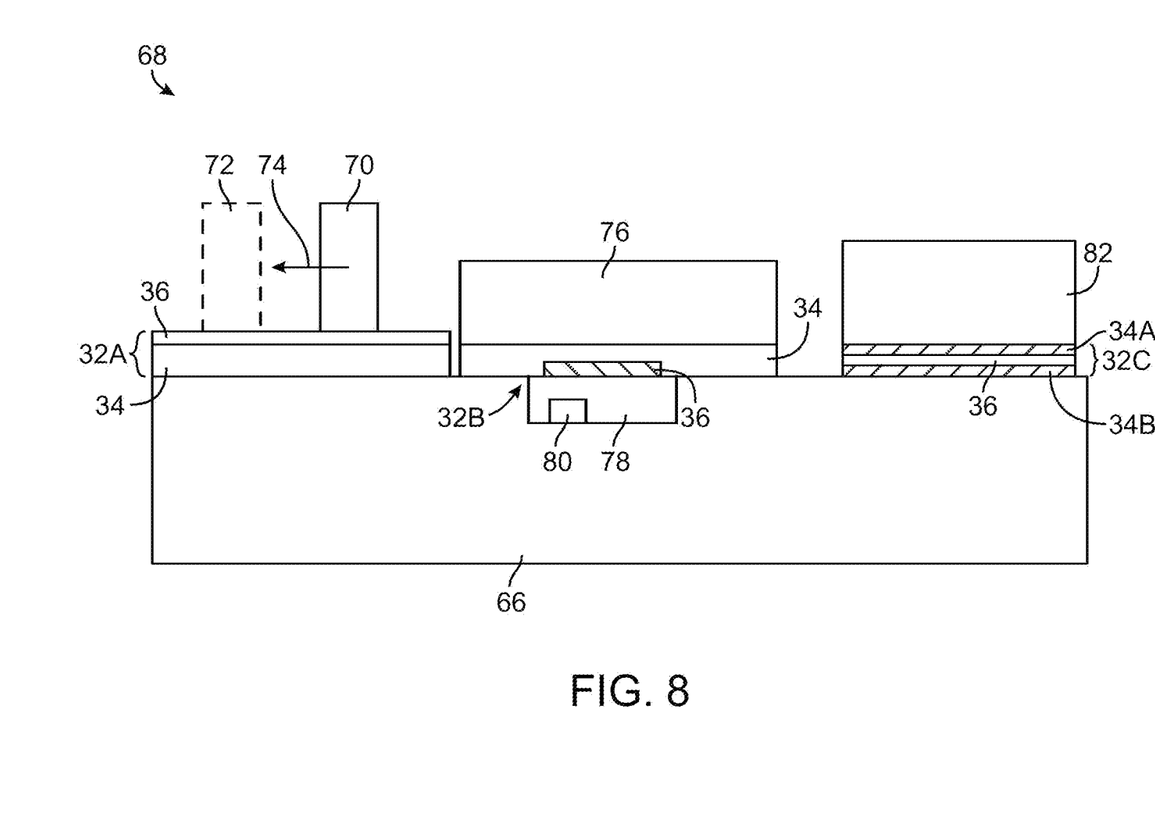
FIG. 8 is a cross-sectional side view of an illustrative electronic device including structures attached with various types of adhesive layers including a one-sided tape of the type shown in FIG. 2, patterned tape of the type shown in FIG. 5, and a two-sided adhesive tape of the type shown in FIG. 7 in accordance with an embodiment of the present invention.

Double-sided tapes such as tape 32 of FIG. 7 may be used to attach structures to each other within an electronic device or other structure. FIG. 8 is a cross-sectional side view of electronic device structures 68 that include three different types of tape 32 (i.e., tapes 32A, 32B, and 32C). In the example of FIG. 8, tape 32A, tape 32B, and tape 32C are attached to structure 66. Structure 66 may be a housing structure or other electronic device structure (as examples) and may be formed form plastic, metal, ceramic, glass, composite materials, other materials, or combinations of these materials.

Tape 32A of FIG. 8 is single-sided tape of the type shown in FIG. 2. Because the upper surface of tape 32A is formed from nonstick layer 36, structures such as structure 70 that are in contact with the exposed surface of nonstick layer 36 are able to move freely. For example, structure 70 may be moved in direction 74 to the position shown by dashed lines 72 without becoming permanently attached to adhesive layer 34 in tape 32A.

Tape 32B of FIG. 8 is a tape with a patterned nonstick layer of the type described in connection with FIG. 5. As shown in FIG. 8, patterned nonstick layer 36 may be aligned with cavity 78 in structure 66. Adhesive 34 may hold nonstick layer 36 in place over cavity 78, thereby sealing cavity 78 and preventing components 80 in cavity 78 from being exposed to dust and moisture. Structures such as component 76 may be attached to adhesive layer 34. When component 76 is attached to adhesive 34, component 76 becomes attached to structure 66.

Tape 32C of FIG. 8 is double-sided tape of the type shown in FIG. 7, having an upper adhesive layer 34A, lower adhesive layer 34B, and an interposed liner layer 36. Tapes such as tape 32C may be used to connect components together. In the FIG. 8 example, structure 82 has been attached to structure 66 by tape 32C.

Figure 9:
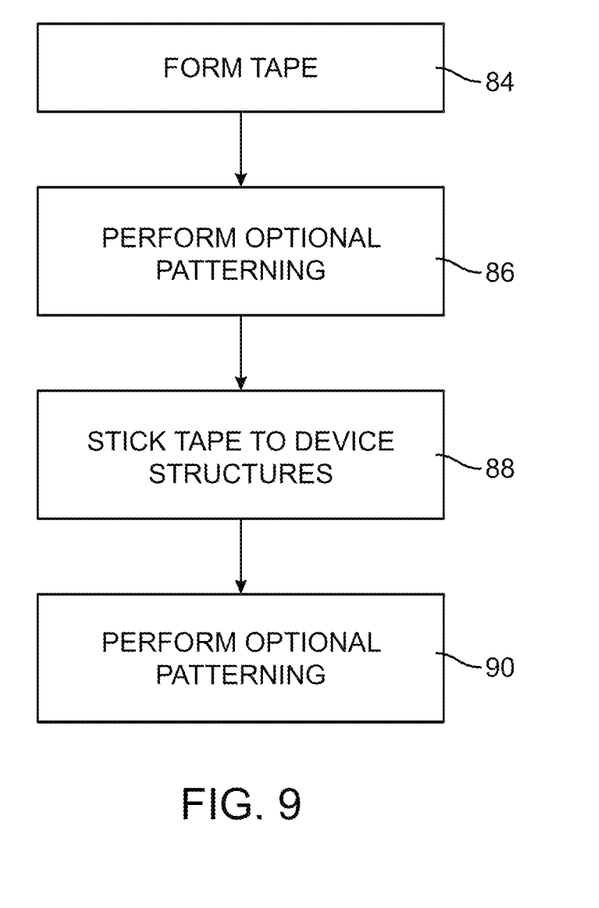
FIG. 9 is a flow chart of illustrative steps involved in forming adhesive tapes and in using adhesive tapes to seal and attach electronic device structures in accordance with an embodiment of the present invention.

FIG. 9 is a flow chart of illustrative steps involved in forming adhesive tapes and in using adhesive tapes to seal and attach electronic device structures. At step 84, tape 32 may be formed (e.g., parylene or other polymer substances may be formed on adhesive layer 36 using chemical vapor deposition or other suitable techniques). Optional patterning operations may be performed at step 86 (e.g., by using a cutting tool). Tape layers may also be patterned by using masks during chemical vapor deposition operations.

At step 88, tape 32 may be attached to structures such as housing structures, structures with cavities and components that are to be sealed (e.g., dome switches and other components of the types shown in FIGS. 3, 4, 6, and 8), etc.

At step 90, optional patterning operations may be performed (e.g., by cutting away excess tape after tape 32 has been attached to a surface).

The foregoing is merely illustrative of the principles of this invention and various modifications can be made by those skilled in the art without departing from the scope and spirit of the invention. The foregoing embodiments may be implemented individually or in any combination.

What is claimed is:

1. Apparatus comprising:
   a structure having a cavity;
   a component mounted in the cavity; and
   tape that is attached to the structure over the cavity, wherein the tape has an adhesive layer having a thickness and has a nonstick polymer layer on the adhesive layer, wherein the nonstick polymer layer has a thickness that is five times less than the thickness of the adhesive layer, wherein the adhesive layer has first and second opposing surfaces, and wherein the nonstick polymer layer is patterned on the first surface so that some regions of the first surface are uncovered by any of the nonstick polymer layer.

2. The apparatus defined in claim 1 wherein the nonstick polymer layer comprises parylene.

3. The apparatus defined in claim 2 wherein the nonstick polymer layer comprises a layer of parylene and wherein the thickness of the polymer layer is less than three microns.

4. The apparatus defined in claim 3 wherein the adhesive comprises permanent pressure sensitive adhesive.

5. The apparatus defined in claim 4 wherein the patterned parylene layer on the first surface faces the component.

6. The apparatus defined in claim 2 wherein the component comprises a switch.

7. The apparatus defined in claim 6 wherein the component comprises a dome switch.

8. Apparatus, comprising:
   a structure;
   a dome switch mounted to the structure; and
   a tape that covers the dome switch, wherein the tape comprises a layer of adhesive and a layer of parylene on the adhesive and wherein the layer of parylene is interposed between the dome switch and the layer of adhesive.

9. The apparatus defined in claim 8 wherein the structure has a surface to which the dome switch is mounted and wherein the layer of adhesive is attached to the surface and attaches the tape over the dome switch.

10. The apparatus defined in claim 9 wherein the adhesive comprises permanent pressure sensitive adhesive.

11. The apparatus defined in claim 10 wherein the layer of parylene has a thickness of less than 3 microns.

12. The apparatus defined in claim 10 wherein the layer of parylene has a thickness of less than one micron.

13. The apparatus defined in claim 8 wherein the structure has a cavity in which the dome switch is mounted.

14. The apparatus defined in claim 13 wherein the parylene layer is patterned and covers only part of the adhesive layer.

15. Apparatus, comprising:
   a first structure;
   a second structure;
   double-sided adhesive tape that connects the first structure to the second structure, wherein the double-sided adhesive tape comprises a layer of polymer having a thickness of less than 3 microns and wherein the layer of polymer is interposed between first and second opposing layers of adhesive each having a thickness of greater than ten times the thickness of the layer of polymer.

16. The apparatus defined in claim 15 wherein the layer of polymer comprises a layer of parylene.

17. The apparatus defined in claim 16 wherein the layer of parylene has a thickness of less than one micron.

18. The apparatus defined in claim 17 wherein the layers of adhesive comprise permanent pressure sensitive adhesive.

* * * * *